US010473242B2

(12) United States Patent
Guo (10) Patent No.: US 10,473,242 B2
(45) Date of Patent: Nov. 12, 2019

(54) COUPLER FOR USE IN LIQUID HEATER AND LIQUID HEATER (71) Applicant: Guangdong Xinbao Electrical Appliances Holdings Co., Ltd., Foshan (CN)

(72) Inventor: Jiangang Guo, Foshan (CN)

(73) Assignee: Guangdong Xinbao Electrical Appliances Holdings Co., Ltd. (CN)

( * ) Notice: Subject to any disclaimer, the term of this patent is extended or adjusted under 35 U.S.C. 154(b) by 1027 days.

(21) Appl. No.: 14/892,960

(22) PCT Filed: May 23, 2014

(86) PCT No.: PCT/CN2014/078351
§ 371 (c)(1),
(2) Date: Nov. 20, 2015

(87) PCT Pub. No.: WO2014/187370
PCT Pub. Date: Nov. 27, 2014

(65) Prior Publication Data
US 2016/0091127 A1 Mar. 31, 2016

(30) Foreign Application Priority Data

May 23, 2013 (CN) .......................... 2013 1 0196518
May 23, 2013 (CN) ..................... 2013 2 0288881 U (51) Int. Cl.
*H01R 13/52* (2006.01)
*H01R 13/533* (2006.01)
(Continued)

(52) U.S. Cl.
CPC ........... *F16L 21/08* (2013.01); *A47J 27/2105* (2013.01); *A47J 27/21008* (2013.01);
(Continued)

(58) Field of Classification Search
None
See application file for complete search history.

(56) References Cited

U.S. PATENT DOCUMENTS 6,080,968 A * 6/2000 Taylor ............... A47J 27/21041
219/432
6,472,646 B1 * 10/2002 Taylor ............... A47J 27/21066
219/481

FOREIGN PATENT DOCUMENTS

CN     2489499 Y     5/2002
CN     2624461 Y     7/2004
(Continued)

OTHER PUBLICATIONS

DE3632143A1, Breaunicke et al, Apr. 1987, partial translation (Year: 1987).*

(Continued)

*Primary Examiner* — Joseph M Pelham
(74) *Attorney, Agent, or Firm* — Lerner, David, Littenberg, Krumholz & Mentlik, LLP (57) ABSTRACT A coupler for use in a liquid heater includes a male connector and a female socket connector. The male connector includes a connecting wall and an annular cylindrical wall formed around the connecting wall. The female socket connector comprises an end wall joined with the connecting wall of the male connector and a peripheral wall formed around the end wall and arranged perpendicularly to the end wall. The surface of the end wall joined with the connecting wall is gradually lowered from the center towards the periphery and is convex-hull shaped. The peripheral wall includes arced sections and gapped sections connected between two arced sections. When the male connector is coupled with the female socket connector, this allows the arced sections to be coupled with the annular cylindrical (Continued)

wall and forms no coupling between the gapped sections and the annular cylindrical wall.

10 Claims, 6 Drawing Sheets (51) Int. Cl.
*F16L 21/08* (2006.01)
*H01R 13/53* (2006.01)
*H01R 13/629* (2006.01)
*A47J 27/21* (2006.01)

(52) U.S. Cl.
CPC ......... *H01R 13/5227* (2013.01); *H01R 13/53* (2013.01); *H01R 13/629* (2013.01)

(56) References Cited

FOREIGN PATENT DOCUMENTS

| | | | | |
|---|---|---|---|---|
| CN | 101034772 | A | 9/2007 | |
| CN | 101409401 | A | 4/2009 | |
| CN | 203423313 | U | 2/2014 | |
| DE | 3632143 | A1 * | 4/1987 | ......... H01R 13/5227 |
| EP | 1215769 | A2 | 6/2002 | |
| FR | 2760904 | A1 | 9/1998 | |
| GB | 2510045 | A * | 7/2014 | ......... H01R 13/5227 |
| JP | H08-250197 | A | 9/1996 | |

OTHER PUBLICATIONS

International Search Report for Application No. PCT/CN2014/078351 dated Sep. 3, 2014.

* cited by examiner

COUPLER FOR USE IN LIQUID HEATER AND LIQUID HEATER

CROSS REFERENCE TO RELATED APPLICATIONS

The present application is a national phase entry under 35 U.S.C. § 371 of International Application No. PCT/CN2014/078351, filed May 23, 2014, which claims priority from Chinese Patent Application No. CN 201310196518.2, filed May 23, 2013, and Chinese Patent Application No. CN 201320288881.2, filed May 23, 2013, all of which are hereby incorporated by reference.

TECHNICAL FIELD

The present disclosure relates to a coupler, and in particular to a coupler for a 360 degree rotary liquid heater. In the meantime, the present disclosure further relates to a liquid heater using the coupler.

TECHNICAL BACKGROUND

A coupler is usually needed in a liquid heater, such as an electric kettle, so that rapid socketing and separation between a heated part and a base of the electrical appliance can be realized. A diversified design of the product requires the size of the coupler to be as small as possible. However, due to the small size, demand for the coordinating precision in the existing technology is also greatly increased. In this case, manufacture deviation, as well as offset and deformation of the coupler during normal use by a consumer may cause potential quality hazard of the product. The smaller the coupler is made, the more easily the relative rotation between a male connector and a female socket connector of the coupler during coordination is jammed. Hence, in order to satisfy high demand for precise coordination, and to address the challenge on precise coordination due to the manufacture deviation and the deformation of the coupler during use, higher demand is raised for the design of the coupler.

In addition, during normal use of the liquid heater, water often drips on the base, but due to small size of the coupler, electrical parts and insulated parts therein should have more compact sizes. Therefore, the water should be expelled out of the coupler as soon as possible, so that the electric safety performance of the liquid heater when power is on will not be influenced.

SUMMARY OF THE INVENTION

The objective of the present disclosure is to provide a coupler for use in a liquid heater. The coupler can not only satisfy requirement of small size and sufficient coordinating precision, but also improve the electric safety performance.

A coupler for use in a liquid heater comprises a male connector and a female socket connector coupled with the male connector. The male connector comprises a connecting wall and an annular cylindrical wall formed around the connecting wall, and the female socket connector comprises an end wall joined with the connecting wall of the male connector and a peripheral wall formed around the end wall and arranged perpendicularly to the end wall. A surface of the end wall joined with the connecting wall is gradually lowered from a center towards a periphery and is convex-hull shaped, and the peripheral wall comprises arced sections and gapped sections connected between two arced sections, so that when the male connector is coupled with the female socket connector, the arced sections are allowed to be coupled with the annular cylindrical wall and no coupling is formed between the gapped sections and the annular cylindrical wall.

Further, the gapped sections are located within a projection area of a contour of the arced sections.

Further, the end wall is provided with a plurality of through holes.

Further, a plurality of tubular divider walls is extended from an undersurface of the end wall respectively at positions corresponding to the through holes.

Further, a guide baffle is formed on the divider wall, the guide baffle extending obliquely.

Further, an undersurface of the guide baffle is disposed lower than an interior surface of the divider wall.

Further, the connecting wall is provided with a mounting hole and a first electric connector mounted thereon, and the peripheral wall forms a cavity, in which a second electric connector is disposed, the first electric connector being in butt joint with the second electric connector through the through holes.

Further, the annular cylindrical wall forms a coordinating space with an upper surface of the connecting wall, and an accommodating space with the lower surface thereof for accommodating the female socket connector.

Further, a plurality of laterally stretching shells is extended laterally outside the annular cylindrical wall.

Further, the peripheral wall is provided with an earth wire.

Further, each two of the arced sections of the peripheral wall are configured symmetrically with each other, and each two of the gapped sections thereof are configured symmetrically with each other.

In addition, a liquid heater is further provided according to the present disclosure, comprising a kettle and a base for heating the kettle, wherein the base is provided with the abovementioned coupler for use in the liquid heater.

As compared with the prior art, in the liquid heater comprising the coupler according to the present disclosure, the peripheral wall of the female socket connector comprises arced sections and gapped sections connected between two arced sections, and the surface of the end wall is gradually lowered from the center towards the periphery and is convex-hull shaped. In this case, jamming of the male connector relative to the female socket connector can be alleviated while the coupling precision is guaranteed. In the meantime, residue of water dripped onto an end surface of the female socket connector can be reduced. Even if small amount of water flows into the coupler from a through hole in the end surface, it will flow out of a bottom of the coupler along the guide baffles on the divider walls, whereby contact between the charged second electric connector and water can be avoided, and the risks of electric shock can be reduced.

BRIEF DESCRIPTION OF THE DRAWINGS

The above is only an overview of the technical solution of the present disclosure. In order to describe the technical solution of the present disclosure more clearly, the accompanying drawings for illustrating the examples of the present disclosure or the prior art will be described briefly. The drawings described herein only correspond to the examples of the present disclosure. Where necessary, an ordinary person skilled in the art can obtain other drawings based on the drawings of the present disclosure without creative work. In the drawings.

DETAILED DESCRIPTION OF THE EMBODIMENTS

In order to elaborate the technical solution of the present disclosure for achieving a predetermined objective, the present disclosure will be clearly and comprehensively described in view of the accompanying drawings. Obviously, the examples described herein are only a part, not all, of the examples of the present disclosure. In addition, technical means or technical features in the examples of the present disclosure can be substituted without any creative work. The present disclosure will be described in detail based on the examples in view of the accompanying drawings.

Figure 1:
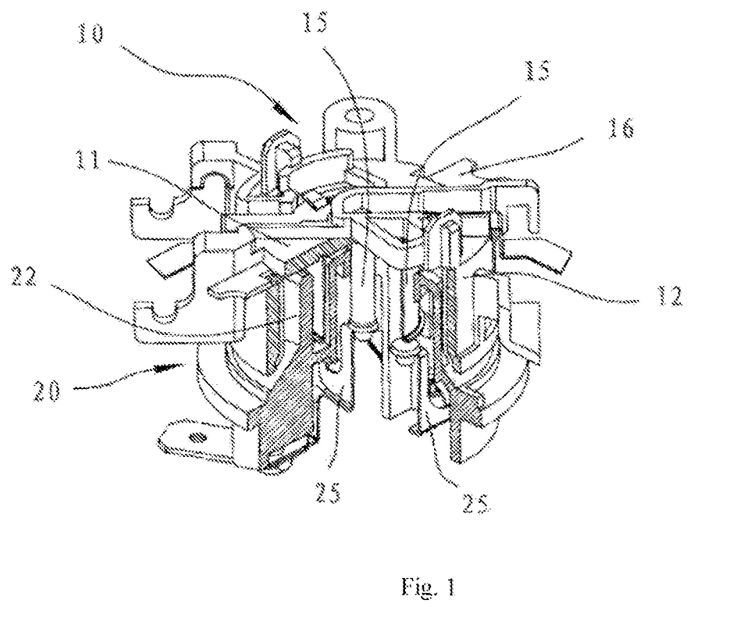
FIG. 1 schematically shows a perspective sectional view of a coupler according to a preferred example of the present disclosure, FIG. 2 schematically shows a sectional view of the coupler according to a preferred example of the present disclosure, FIG. 3 schematically shows a top view of a female socket connector of the coupler as shown in FIG. 1, FIG. 4 schematically shows a right side view of the female socket connector of the coupler as shown in FIG. 1, FIG. 5 schematically shows a sectional view of the female socket connector of the coupler as shown in FIG. 3, and FIG. 6 schematically shows a bottom view of the female socket connector of the coupler as shown in FIG. 1.
Figure 2:
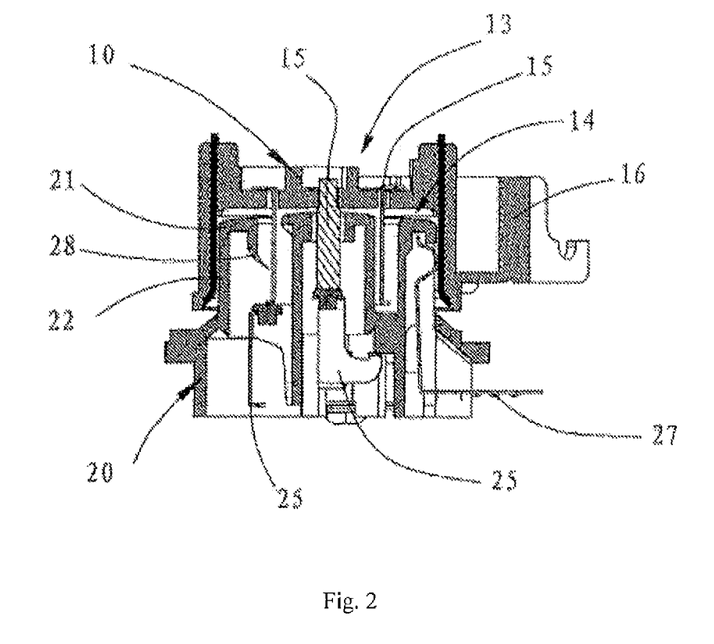
Figure 3:
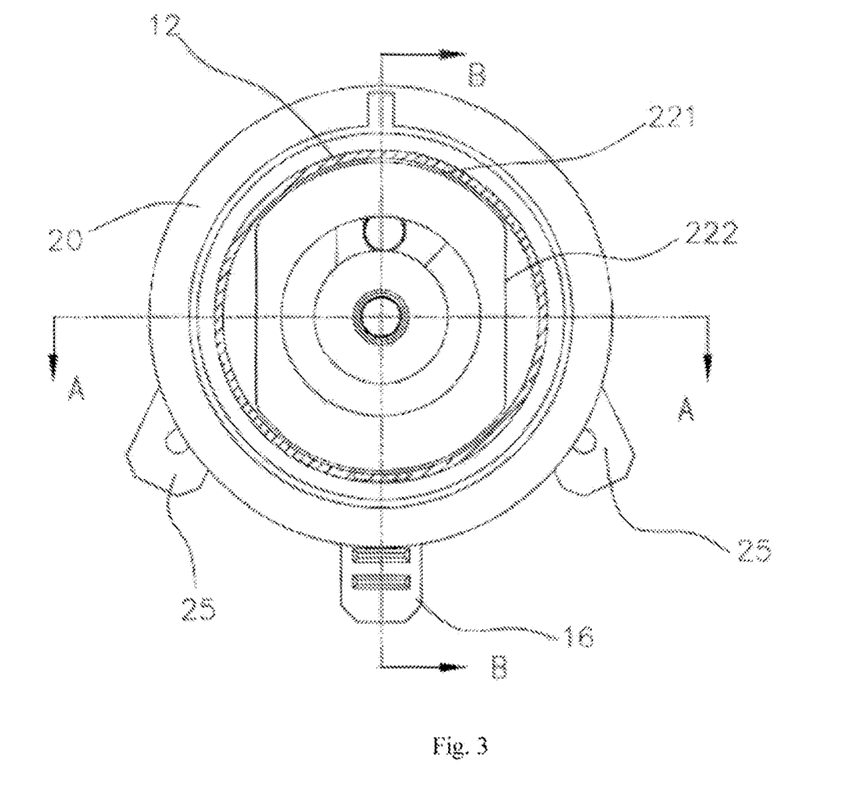
Figure 4:
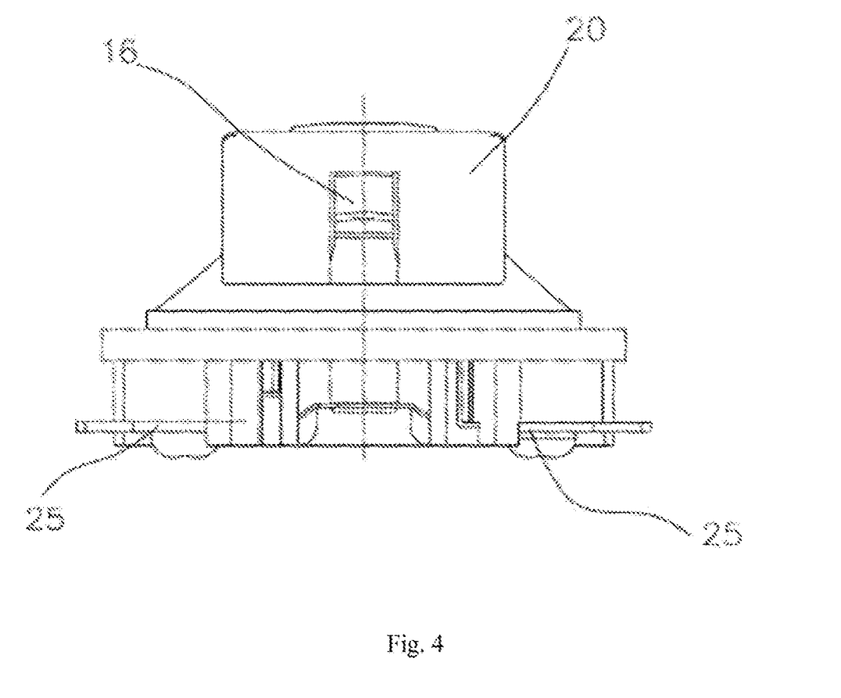

As shown in FIGS. 1 and 2, a coupler according to a preferred example of the present disclosure is disposed in a base of a liquid heater, such as an electric kettle, so that the electric kettle can be electrically connected to the base. The coupler comprises a male connector 10 and a female socket connector 20 coupled with the male connector 10.

The male connector 10 comprises a connecting wall 11 and an annular cylindrical wall 12 formed around and perpendicularly to the connecting wall 11. The annular cylindrical wall 12 extends perpendicularly to the connecting wall 11 and connects an upper surface and a lower surface of the connecting wall 11, and forms a coordinating space 13 with the upper surface and an accommodating space 14 with the lower surface. A plurality of building blocks is disposed in the coordinating space 13 for coordinating with components in a bottom of the kettle when a charged base coordinates with the kettle. The connecting wall 11 is provided with a number of mounting holes, and a same number of first electric connectors 15 are mounted thereon. An end of the first electric connector 15 protrudes out of the upper surface of the connecting wall 11 and enters into the coordinating space 13, and an other end thereof protrudes out of the lower surface of the connecting wall 11 and enters into the accommodating space 14. According to the present example, provided is two first electric connectors 15 for electric connections with respectively an anode and a cathode. A plurality of laterally stretching shells 16 is extended laterally outside the annular cylindrical wall 12 for coordinating with components inside the base in a manner of engagement when being assembled.

Figure 5:
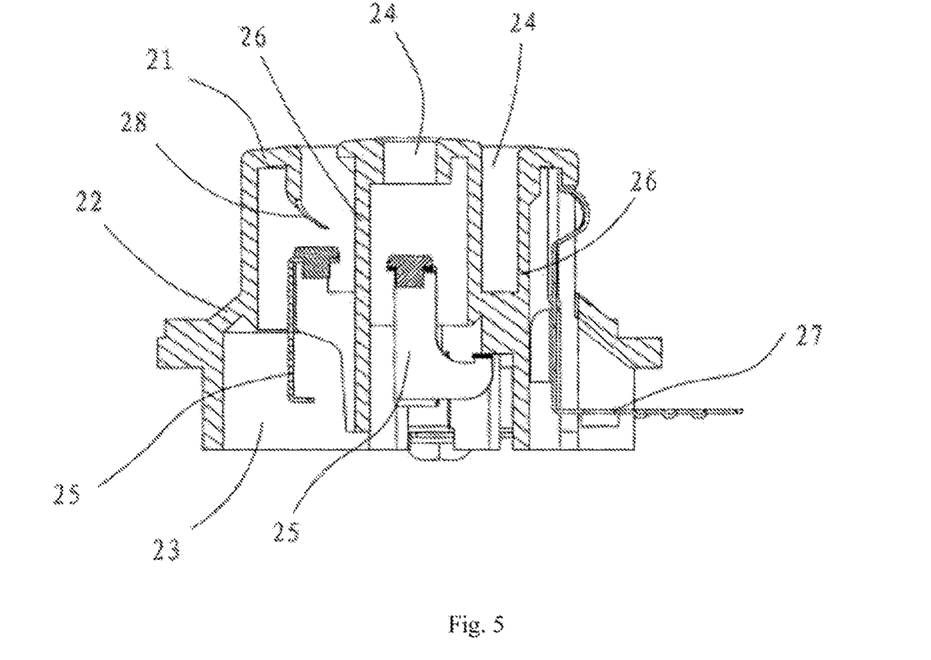
Figure 6:
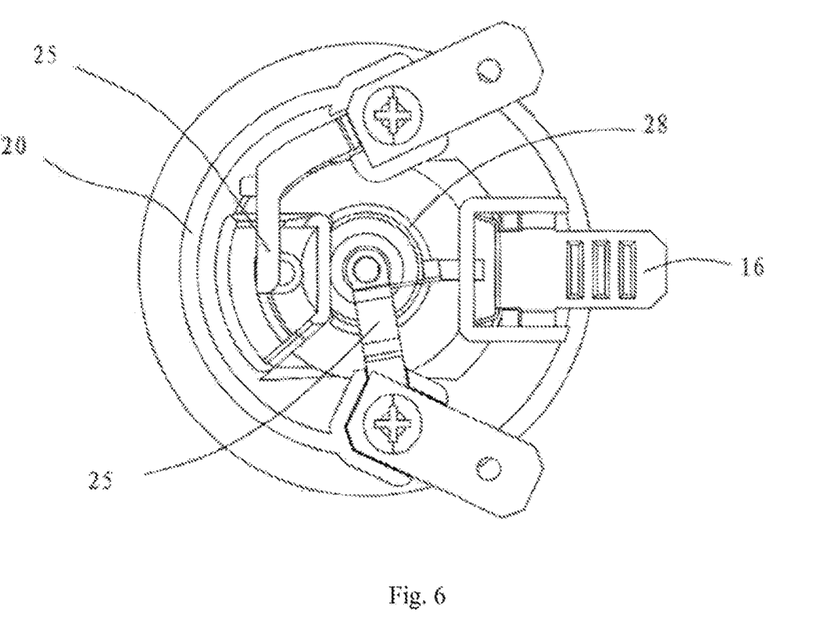

The female socket connector 20 comprises an end wall 21 joined with the connecting wall 11 of the male connector 10, and a peripheral wall 22 formed around the end wall 21, and extending downward from and arranged perpendicularly to the end wall 21. The peripheral wall 22 encloses into a cavity around an end of the end wall 21. As shown in FIG. 5, a surface of the end wall 21 joined with the connecting wall 11 is gradually lowered from a center towards a periphery and thus is convex-hull shaped. In this case, water drops dripped onto the surface of the end wall 21 can slide down along the end wall 21 rapidly and be expelled, rather than staying thereon. The end wall 21 is provided with a plurality of through holes 24. The number and positions of the through holes 24 correspond to the number and positions of the first electric connectors 15 of the male connector 10, so that the first electric connectors 15 can enter into the cavity 23 through these through holes 24. A plurality of second electric connectors 25 is disposed in the cavity 23 for connecting with the first electric connectors 15. The second electric connectors 25 can be fixed in the cavity 23 by being connected with an interior of the peripheral wall 22. According to the present example, provided is two second electric connectors 25 for electric connections with respectively an anode and a cathode.

A plurality of divider walls 26, which are located at positions on an undersurface of the end wall 21 respectively corresponding to the through holes 24, is extended in the cavity 23 along an axial direction, so that each two of the first electric connectors 15 that enter into the cavity 23 are divided by a divider wall 26. A guide baffle 28 is formed on the divider wall 26. The guide baffle 28 extends obliquely, and an undersurface of the guide baffle 28 is disposed lower than an interior surface of the corresponding divider wall 26, so that water flowing from the end wall 21 to the through hole 24 can be led out along the guide baffle 28, instead of going over the guide baffle 28 onto an interior surface of the cavity 23. In this case, contact of water with the second electric connectors 25, which are disposed on the interior surface of the cavity 23, can be prevented, whereby electric safety can be guaranteed.

As shown in FIG. 3 to FIG. 6, the peripheral wall 22 comprises arced sections 221 and gapped sections 222 connected between two arced sections 221. The arced sections 221 each form an arc surface for coupling with the annular cylindrical wall 12 of the male connector 10 when being assembled. When the male connector 10 is coupled with the female socket connector 20, no coupling is formed between the gapped sections 222 and the annular cylindrical wall 12. In this case, when a small sized coupler is made, jamming between the annular cylindrical wall 12 and the peripheral wall 22 will not occur as easily as complete arc surface coupling does, so that the male connector 10 can rotate relative to the female socket connector 20 and be precisely positioned. Each two of the arced sections 221 are configured symmetrically with each other, and each two of the gapped sections 222 are configured symmetrically with each other. In the present example, two arced sections 222 are provided and symmetrically arranged on the peripheral wall 22.

Further, an earth wire 27 is led out of the peripheral wall 22 for forming a ground loop for the coupler.

On a coupling surface of the coupler according to the present disclosure, the peripheral wall 22 of the female socket connector 20 comprises arced sections 221 and gapped sections 222 (which can be respectively called hollow edge or non-hollow edge), so that jamming caused by a distortion of a circumference can be reduced while ensuring coupling precision. In addition, the surface of the end wall 21 of the female socket connector 20 is gradually lowered from the center towards the periphery, so that water can flow out along the surface of the end wall 21, whereby residue of water dripped onto an end surface of the female socket connector 20 can be reduced. As a result, the risks of electric shock can be reduced. The gapped sections 222 are located within a projection region of a contour of the arced sections 221, so that the surface of the end wall 21 of the female socket connector 20 is nearer to a center of the female socket connector 20 at the gapped sections 222. That is, the smaller an area of the end wall 21, the shorter time the water would stay on the end wall 21, whereby water can easily flow out from the gapped sections 222. In addition, the size of the female socket connector 20 can be reduced due to the non-hollow edge, whereby cost of assembly space in the material costs can be reduced accordingly. In this case, the coupler can be smaller, so that requirement of diversified design of the liquid heater can be satisfied. The liquid heater, such as a kettle, using the coupler according to the present disclosure has the advantages of high safety performance, long service life, and low production cost.

The examples described above are only preferred examples of the present disclosure, thus should not be construed as any form of limitation to the present disclosure. Various modifications can be made by any one skilled in the art to the present disclosure without departing from the scope and spirit of the present disclosure and components in the present disclosure could be substituted with equivalents. Any amendments, substitution, or improvements to the examples within the spirit and principle of the present disclosure fall within the scope of the present disclosure.

The invention claimed is:

1. A coupler for use in a liquid heater, comprising a male connector and a female socket connector coupled with the male connector, wherein the male connector comprises a connecting wall and an annular cylindrical wall formed around the connecting wall, and the female socket connector comprises an end wall combined with the connecting wall of the male connector and a peripheral wall formed around the end wall and arranged perpendicularly to the end wall, wherein a surface of the end wall combined with the connecting wall is lowered from a center towards a periphery and is convex shaped, and the peripheral wall comprises arced sections and gapped sections connected between two arced sections, so that when the male connector is coupled with the female socket connector, the arced sections are allowed to be coupled with the annular cylindrical wall and the gapped sections do not contact with the annular cylindrical wall, and wherein the female socket connector and the male connector come into contact with each other when the female and male connectors are coupled.

2. The coupler for use in a liquid heater according to claim 1, wherein the end wall is provided with a plurality of through holes.

3. The coupler for use in a liquid heater according to claim 1, wherein the gapped sections are located within a projection region of a contour of the arced sections.

4. The coupler for use in a liquid heater according to claim 2, wherein a plurality of tubular divider walls is extended from an undersurface of the end wall respectively at positions corresponding to the through holes.

5. The coupler for use in a liquid heater according to claim 4, wherein a guide baffle is formed on the divider wall, the guide baffle extending obliquely.

6. The coupler for use in a liquid heater according to claim 5, wherein an undersurface of the guide baffle is disposed lower than an interior surface of the divider wall, and the guide baffle forms a closed annular ring around an outer contour surface of the through hole.

7. The coupler for use in a liquid heater according to claim 2, wherein
the connecting wall is provided with a mounting hole and a first electric connector mounted thereon, and
the peripheral wall forms a cavity, in which a second electric connector is disposed,
the first electric connector being in butt joint with the second electric connector through the through hole.

8. The coupler for use in a liquid heater according to claim 1, wherein a plurality of laterally stretching shells is extended laterally outside the annular cylindrical wall.

9. The coupler for use in a liquid heater according to claim 1, wherein each two of the arced sections on the peripheral wall are configured symmetrically with respect to each other, and each two of the gapped sections thereon are configured symmetrically with respect to each other.

10. A liquid heater, comprising a kettle and a base for heating the kettle, wherein the base is provided with a coupler for use in the liquid heater according to claim 1.

* * * * *